US012708988B1

(12) United States Patent
James

(10) Patent No.: US 12,708,988 B1
(45) Date of Patent: Aug. 18, 2026

(54) PENDULUM HAMMER ASSEMBLIES

(71) Applicant: Edward B. James, Atlanta, TX (US)

(72) Inventor: Edward B. James, Atlanta, TX (US)

( * ) Notice: Subject to any disclaimer, the term of this patent is extended or adjusted under 35 U.S.C. 154(b) by 364 days.

(21) Appl. No.: 18/509,885

(22) Filed: Nov. 15, 2023

(51) Int. Cl.
*B25B 27/00* (2006.01)
*B25D 1/00* (2006.01)

(52) U.S. Cl.
CPC ................ *B25B 27/00* (2013.01); *B25D 1/00* (2013.01)

(58) Field of Classification Search
CPC ........................................................ E21B 1/02
USPC .... 173/100, 93, 95, 96, 97, 135, 293, 12.14, 173/185
See application file for complete search history.

(56) References Cited

U.S. PATENT DOCUMENTS

| | | | | | |
|---|---|---|---|---|---|
| 865,174 | A * | 9/1907 | Evans | B25D 11/10 | 173/100 |
| 865,175 | A * | 9/1907 | Evans | B25D 11/10 | 173/100 |
| 914,545 | A * | 3/1909 | Akin | E02D 7/04 | 173/126 |
| 1,273,733 | A * | 7/1918 | Calderwood | E04H 17/263 | 173/100 |
| 1,296,918 | A * | 3/1919 | Calderwood | B25D 11/10 | 173/100 |
| 1,921,503 | A * | 8/1933 | Calderwood | E21B 15/006 | 173/100 |
| 2,529,892 | A | 11/1950 | Adams | | |
| 3,384,186 | A | 5/1968 | Broderson et al. | | |
| 3,586,112 | A * | 6/1971 | Kelley | B02C 1/00 | 173/100 |
| 3,805,897 | A | 4/1974 | Cobb | | |
| 3,903,971 | A * | 9/1975 | Watanabe | E21B 1/02 | 173/100 |
| 4,243,107 | A | 1/1981 | Shook | | |
| 4,884,641 | A | 12/1989 | Kendall | | |
| 4,984,639 | A | 1/1991 | Lindsay | | |
| 5,234,282 | A | 8/1993 | Osborn | | |
| 5,333,937 | A | 8/1994 | Hopkins | | |
| 5,540,006 | A | 7/1996 | Lloyd | | |
| 6,990,845 | B2 * | 1/2006 | Voon | G01N 3/48 | 73/12.14 |
| 7,036,606 | B2 | 5/2006 | Rossi | | |
| 10,843,322 | B1 | 11/2020 | Williams | | |
| 2004/0103713 | A1 * | 6/2004 | Voon | G01N 3/48 | 73/12.04 |
| 2013/0098649 | A1 | 4/2013 | Charbonneau | | |

* cited by examiner

*Primary Examiner* — Jason L Vaughan
(74) *Attorney, Agent, or Firm* — R. Keith Harrison

(57) ABSTRACT

A pendulum hammer assembly suitable for mounting on an elevated or elevatable support structure may include an assembly frame configured for deployment on the support structure. At least one assembly hammer may be supported by the assembly frame. The assembly hammer may be selectively deployable in a hammer stowage position resting on the assembly frame and a swingable hammer position suspended from and beneath the assembly frame.

20 Claims, 12 Drawing Sheets

PENDULUM HAMMER ASSEMBLIES

FIELD

Illustrative embodiments of the disclosure generally relate to hammer devices. More particularly, illustrative embodiments of the disclosure relate to pendulum hammer assemblies suitable for a variety of applications including but not limited to the expeditious removal of a fastener from a fastener opening.

SUMMARY

Illustrative embodiments of the disclosure are generally directed to pendulum hammer assemblies suitable for mounting on an elevated or elevatable support structure and suitable for a variety of applications including but not limited to the expeditious removal of a fastener from a fastener opening. An illustrative embodiment of the pendulum hammer assemblies may include an assembly frame configured for deployment on the support structure. At least one assembly hammer may be supported by the assembly frame. The assembly hammer may be selectively deployable in a hammer stowage position in which the assembly hammer rests on the assembly frame and a swingable hammer position in which the assembly hammer is suspended from and beneath the assembly frame. The assembly hammer may be actuated in a swinging motion beneath the assembly frame to strike the fastener or other workpiece.

In another aspect, at least one strike pin may be supported by the assembly frame. The strike pin may be positionable to transfer the strike force from the assembly hammer to the workpiece.

In another aspect, at least one strike pin holder may be supported by the assembly frame. The strike pin may be selectively deployable in a pin stowage position in the strike pin holder and in a functional position removed from the strike pin holder.

In another aspect, the assembly frame may include at least one elongated assembly frame member having a frame member interior. The frame member interior may be suitably sized and configured to receive a component of the support structure in mounting of the pendulum hammer assembly on the support structure.

In another aspect, at least one cable eye may be provided on the assembly frame. The cable eye may be sized and configured to receive at least one frame support cable attached to the support structure for purposes of anchoring or reinforcing the assembly frame on the support structure.

In another aspect, at least one hammer assembly hinge may pivotally connect the assembly hammer to the assembly frame.

In another aspect, the assembly frame may include a pair of elongated, parallel, spaced-apart assembly frame members and a frame space between the assembly frame members. The frame space may at least partially receive the assembly hammer in the hammer stowage position.

In another aspect, at least one hammer rest may span the frame space and connect the assembly frame members. The assembly hammer may rest on the hammer rest in the hammer stowage position.

In another aspect, the assembly frame members may have a pair of frame member interiors, respectively, suitably sized and configured to receive a pair of components, respectively, of the support structure in mounting of the pendulum hammer assembly on the support structure.

In another aspect, the assembly hammer may include a hammer shaft pivotally supported by the assembly frame and a hammer head supported by the hammer shaft.

In another aspect, at least one tether attachment member may be provided on the hammer head. A hammer tether may be attachable to the tether attachment member. The hammer tether may be manipulatable to actuate the assembly hammer in the swinging motion.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
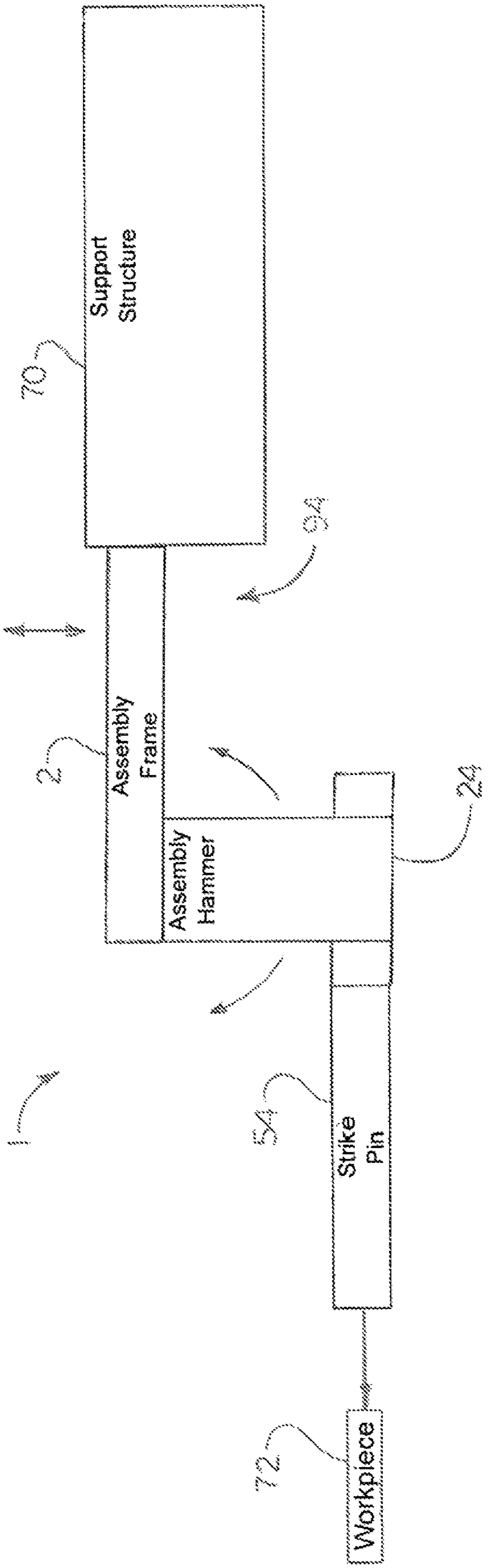
FIG. 1 is a block diagram of the pendulum hammer assemblies.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition terms "comprise", "comprises", "comprising", "include", "includes", "including", "is", "has", "having" or the like means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction.

Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

Referring initially to FIG. 1 of the drawings, an illustrative embodiment of the pendulum hammer assemblies is generally indicated by reference numeral 1. The pendulum hammer assembly 1 may be suitable for mounting on an elevated or elevatable support structure 70. The support structure 70 may include any structure or combination of structures suitable for supporting the pendulum hammer assembly 1 at an elevated operating position. For example and without limitation, in some applications, the support structure 70 may include a vehicle such as a fork truck 76 (FIGS. 12-18), as will be hereinafter further described. Alternatively, the support structure 70 may include a hydraulic, pneumatic, and/or mechanical lift or jack. Accordingly, the support structure 70 may be suitably configured to lift or raise the pendulum hammer assembly 1 from the floor or other support surface (not illustrated) to the elevated operating position for operation of the pendulum hammer assembly 1, typically as will be hereinafter described. In some applications, the pendulum hammer assembly 1 may include a wall, frame, elevated rail, platform, and/or other fixed support structure. The pendulum hammer assembly 1 may be initially lifted or raised to the elevated operating position and then attached to the fixed height support structure 70 at the elevated operating position on the support structure 70.

The pendulum hammer assembly 1 may include an assembly frame 2. The assembly frame 2 may be configured for deployment on or attachment to the support structure 70 typically according to the knowledge of those skilled in the art. In embodiments and applications of the pendulum hammer assembly 1 in which the support structure 70 includes the fork truck 76, the assembly frame 2 may be suitably configured to receive at least one lift frame arm 81 (FIGS. 12 and 13) on the fork truck 76, typically as will be hereinafter described. In other applications of the pendulum hammer assembly 1, the assembly frame 2 may be attached to a surface, element, and/or other component of the support structure 70 using bolts, clamps, flanges, tongues and grooves, and/or other suitable fastening device or devices suitable for the purpose.

At least one assembly hammer 24 may be supported by the assembly frame 2. The assembly hammer 24 selectively deployable in a hammer stowage position (not illustrated in FIG. 1) in which the assembly hammer 24 rests on the assembly frame 2 and in a swingable hammer position in which the assembly hammer 24 is suspended from the assembly frame 2 within a hammer swing space 94 beneath the assembly frame 2, as illustrated. Accordingly, the assembly hammer 24 may be moved in a swinging motion or trajectory beneath the assembly frame 2 for impact of the assembly hammer 24 with a workpiece 72. The assembly hammer 24 may be configured to strike the workpiece 72 directly or through a strike pin 54, as illustrated. The components of the assembly frame 2, assembly hammer 24, strike pin 54 and other components of the pendulum hammer assembly 1 may be fabricated of steel, aluminum, high-density plastic, carbon fiber composite, and/or other metals and/or materials which are consistent with the functional requirements of the pendulum hammer assembly 1.

The workpiece 72 may include any type of fastener, component, or element which is to be struck by the assembly hammer 24 to facilitate installation, removal, and/or other disposition of the workpiece 72. For example and without limitation, in some applications, the workpiece 72 may include a nail, bolt, rivet, or other fastener which is to be removed from a fastener opening in adjoining components of a structure, typically as will be hereinafter described. In some applications, the workpiece 72 may include a nail or other fastener which is to be driven into components which are to be attached in a structure.

Figure 2:
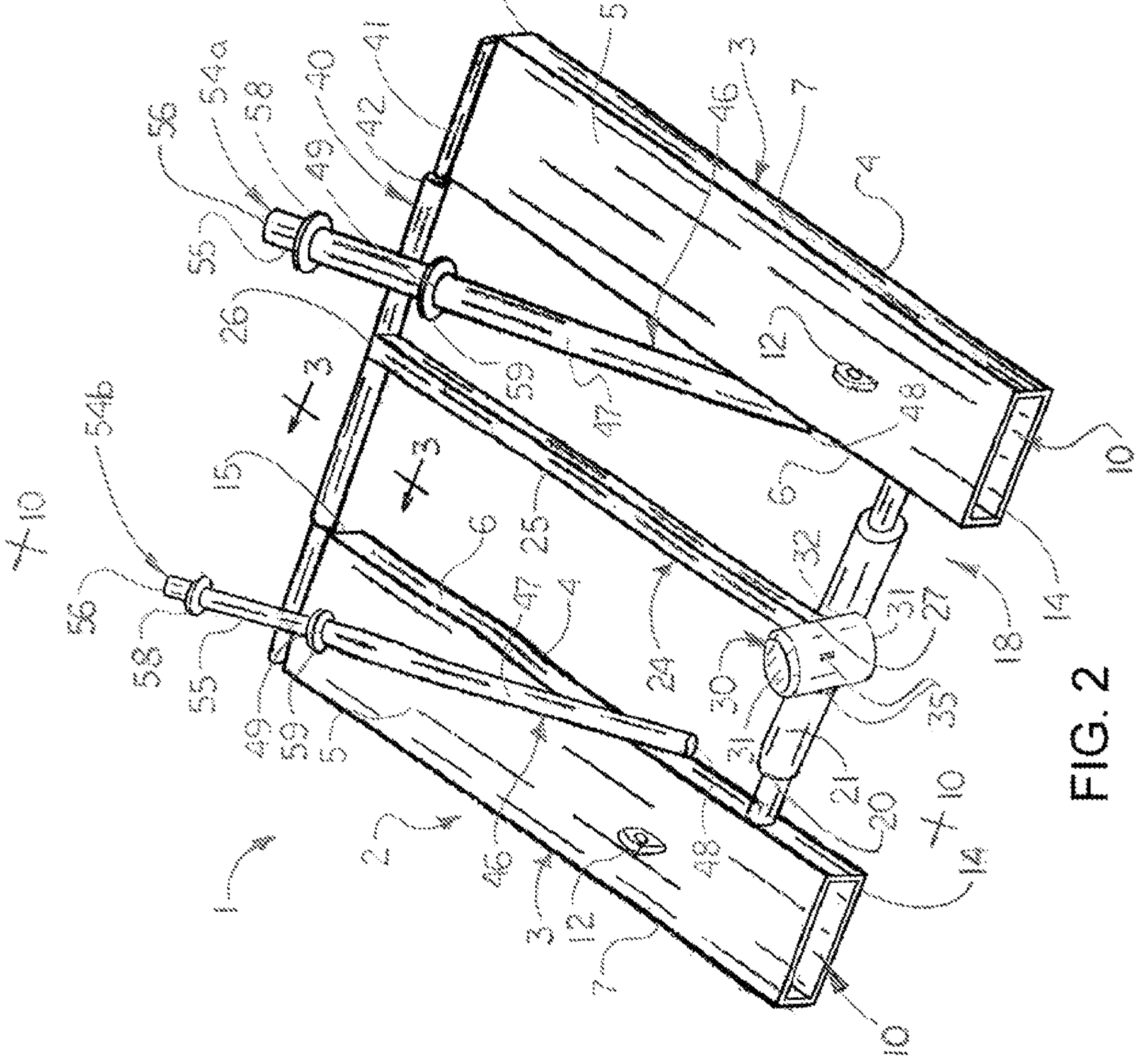
FIG. 2 is a front perspective view of an illustrative embodiment of the pendulum hammer assemblies, with an assembly hammer deployed in a resting hammer stowage position on an assembly frame of the assembly.
Figure 4:
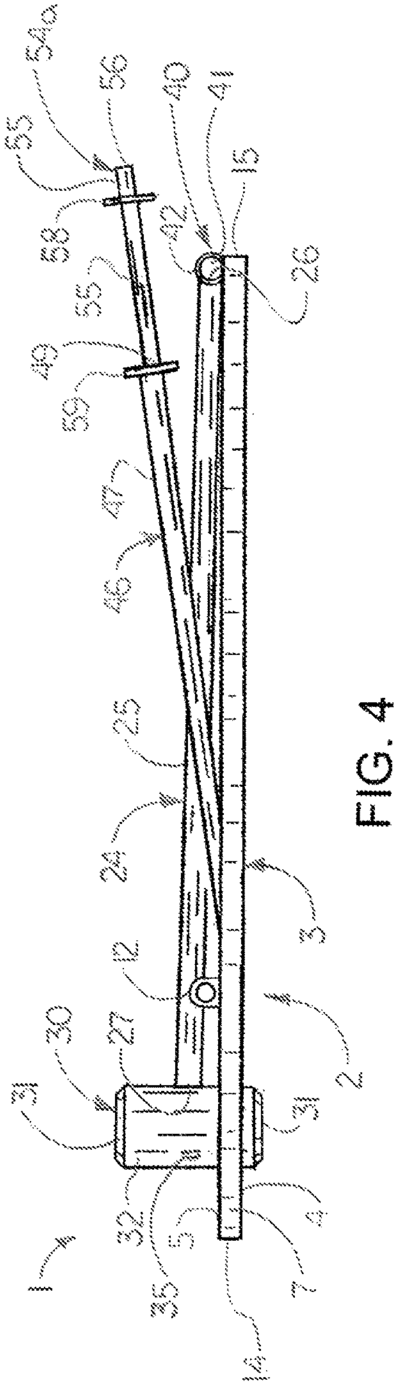
FIG. 4 is a left side view of the illustrative pendulum hammer assembly illustrated in FIG. 2.
Figure 5:
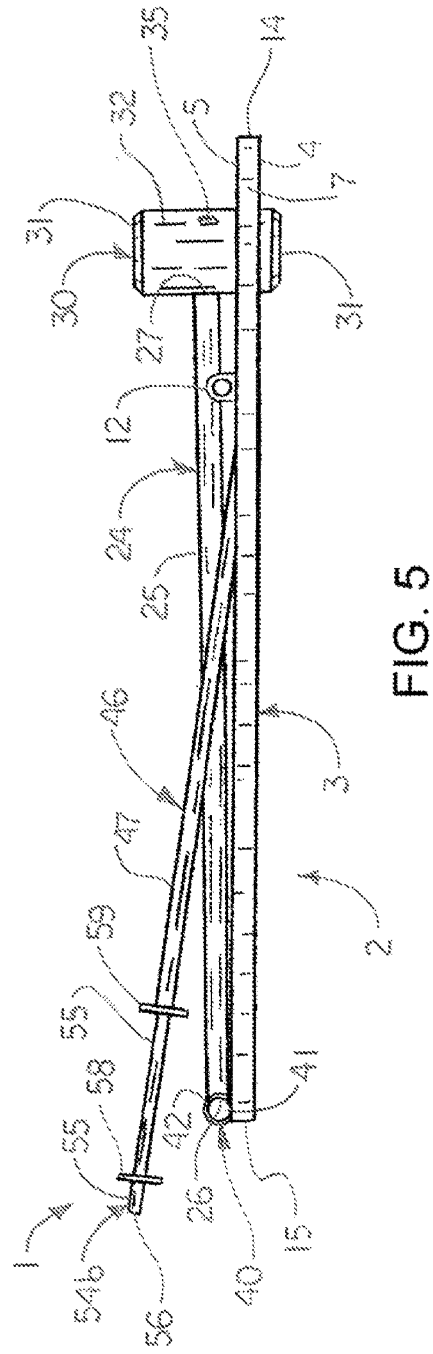
FIG. 5 is a right-side view of the illustrative pendulum hammer assembly.
Figure 6:
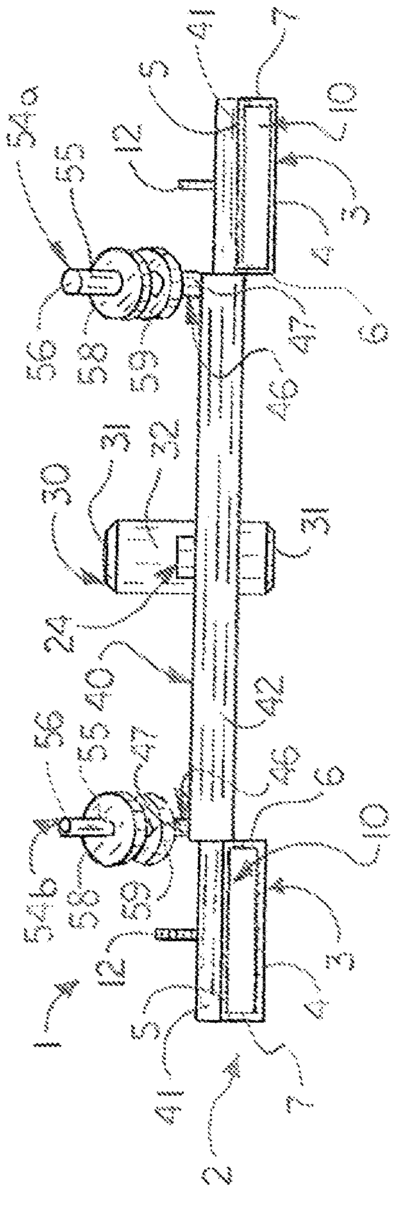
FIG. 6 is a rear view of the illustrative pendulum hammer assembly.
Figure 7:
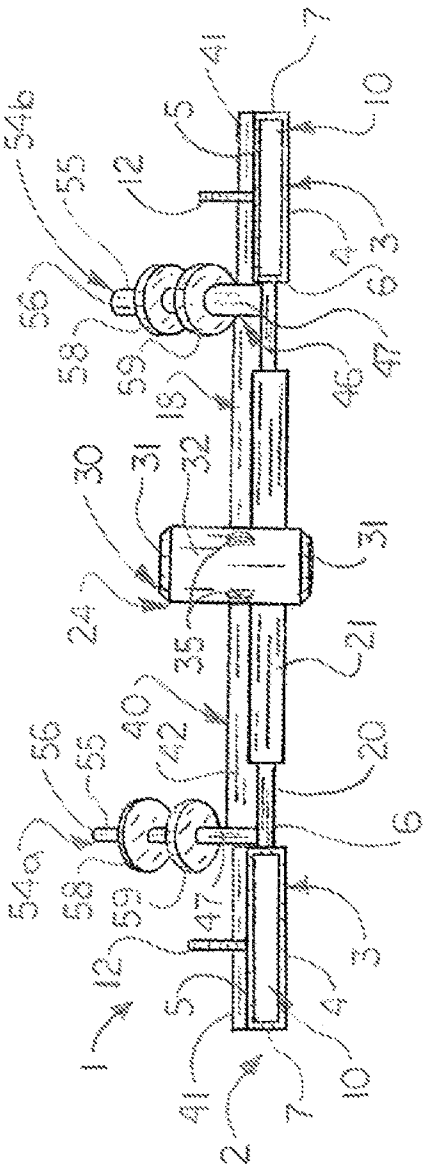
FIG. 7 is a front view of the illustrative pendulum hammer assembly.
Figure 8:
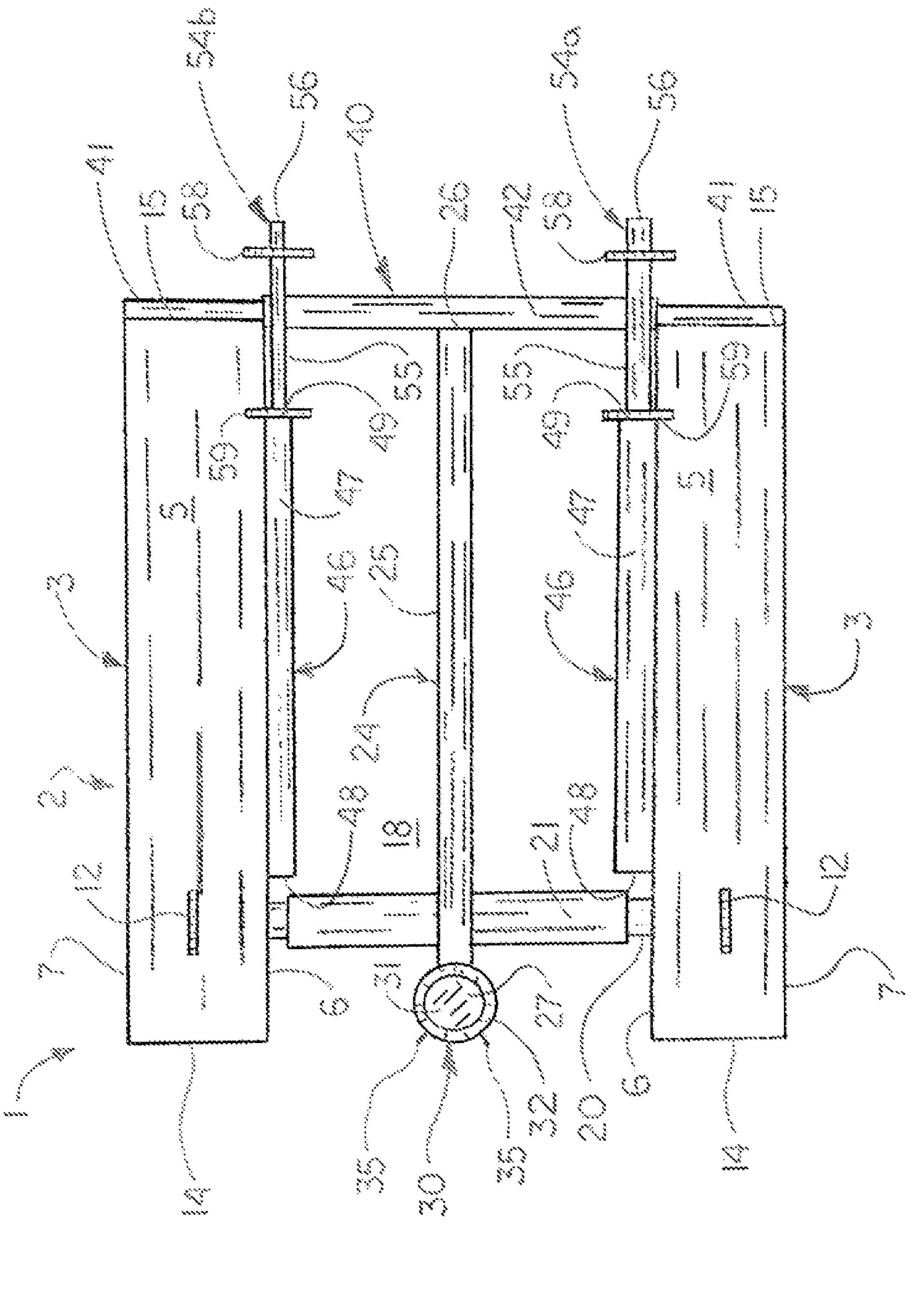
FIG. 8 is a top view of the illustrative pendulum hammer assembly.
Figure 9:
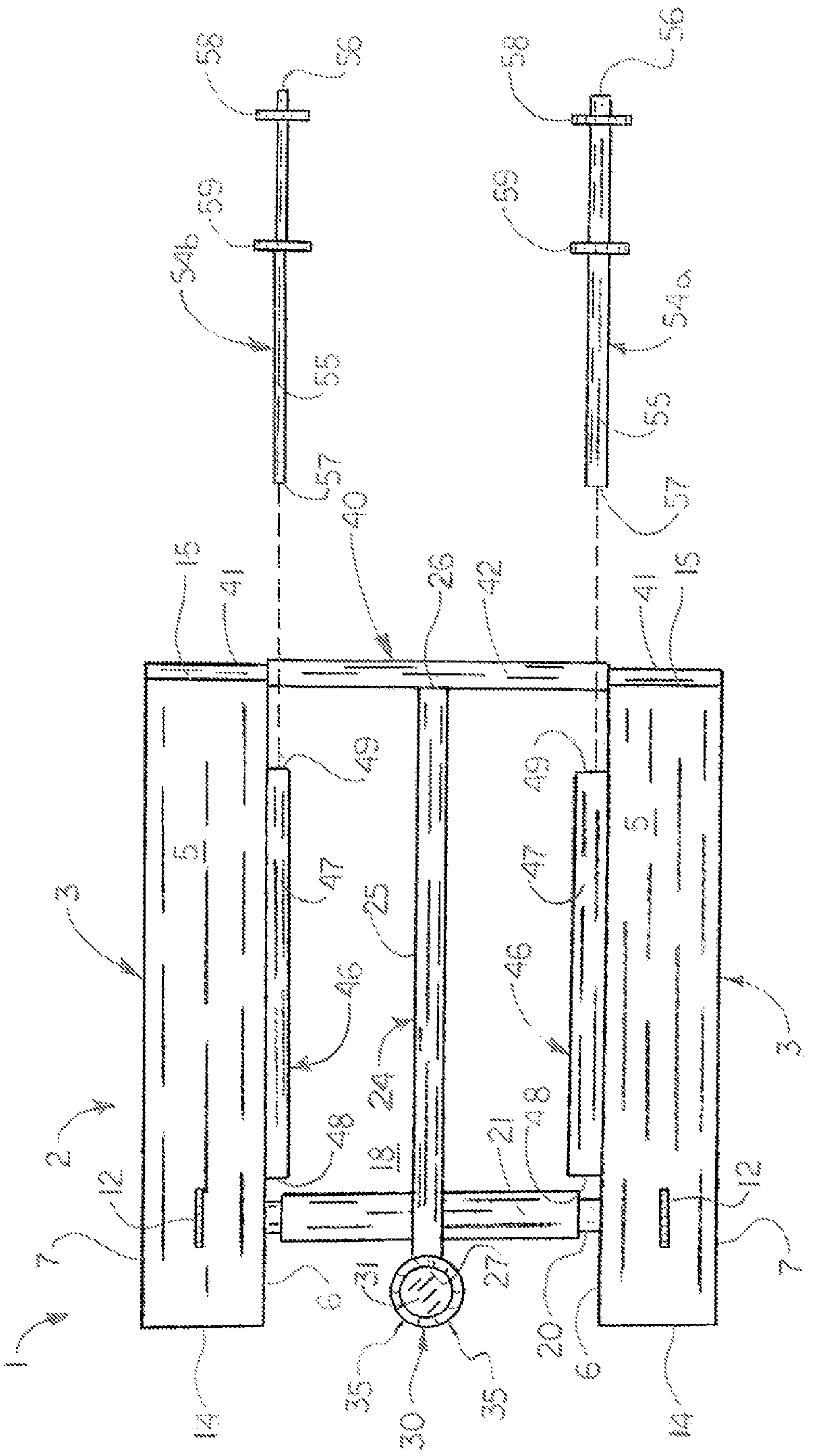
FIG. 9 is an exploded top view of the illustrative pendulum hammer assembly, with a pair of strike pins removed from a respective pair of strike pin holders on the assembly frame.

Referring next to FIGS. 2-11 of the drawings, in some embodiments, the assembly frame 2 of the pendulum hammer assembly 1 may be suitably configured for deployment on at least one lift frame arm 81 (FIG. 12) on the lift frame 80 of the fork truck 76. Accordingly, the assembly frame 2 may include at least one, and typically, a pair of elongated, parallel, spaced-apart assembly frame members 3. The spacing between the assembly frame members 3 of the assembly frame 2 may correspond to the spacing between the lift frame arms 81 on the lift frame 80 of the fork truck 76. Each assembly frame member 3 may have an open front frame member end 14 and a rear frame member end 15. As illustrated in FIG. 2, a frame member interior 10 may extend from the open front frame member end 14. The frame member interior 10 of each assembly frame member 3 may be sized and configured to receive a corresponding one of the lift frame arms 81 on the lift frame 80 of the fork truck 76 in deployment of the pendulum hammer assembly 1 on the lift frame 80 of the fork truck 76.

In some embodiments, each assembly frame member 3 of the assembly frame 2 may have an elongated, rectangular shape. Each assembly frame member 3 may include rectangular tubing with a bottom member panel 4. A top member panel 5 may be disposed in parallel, spaced-apart relationship to the bottom member panel 4. An inner member panel 6 and an outer member panel 7 may connect the top member panel 5 to the bottom member panel 4. The frame member interior 10 may be formed by and between the bottom member panel 4, the top member panel 5, the inner member panel 6 and the outer member panel 7. The frame member interior 10 of each assembly frame member 3 may have a width and height which slightly exceed the respective width and height or thickness of a corresponding lift frame arm 81 (FIG. 12) on the lift frame 80 of the fork truck 76 to facilitate insertion of the lift frame arm 81 into the frame member interior 10.

In some embodiments, at least one cable eye 12 may be provided on the assembly frame 2. For example and without limitation, a pair of cable eyes 12 may be provided on the top member panels 5 of the respective assembly frame members 3. Each cable eye 12 may facilitate securement of a corresponding frame support cable 84 (FIG. 16), attached to the lift frame 80 of the fork truck 76, to the assembly frame 2 for stabilizing or anchoring the assembly frame 2 on the lift frame 80.

A frame space 18 may be formed by and between the assembly frame members 3 of the assembly frame 2. The inner member panels 6 of the assembly frame members 3 may face each other across the frame space 18. At least one hammer rest 20 may span the frame space 18 and connect the assembly frame members 3. As illustrated in FIG. 2, in the hammer stowage position, the assembly hammer 24 may rest on the hammer rest 20. In some embodiments, at least one hammer rest pad 21 may be provided over the hammer rest 20 for cushioning purposes.

Figure 11:
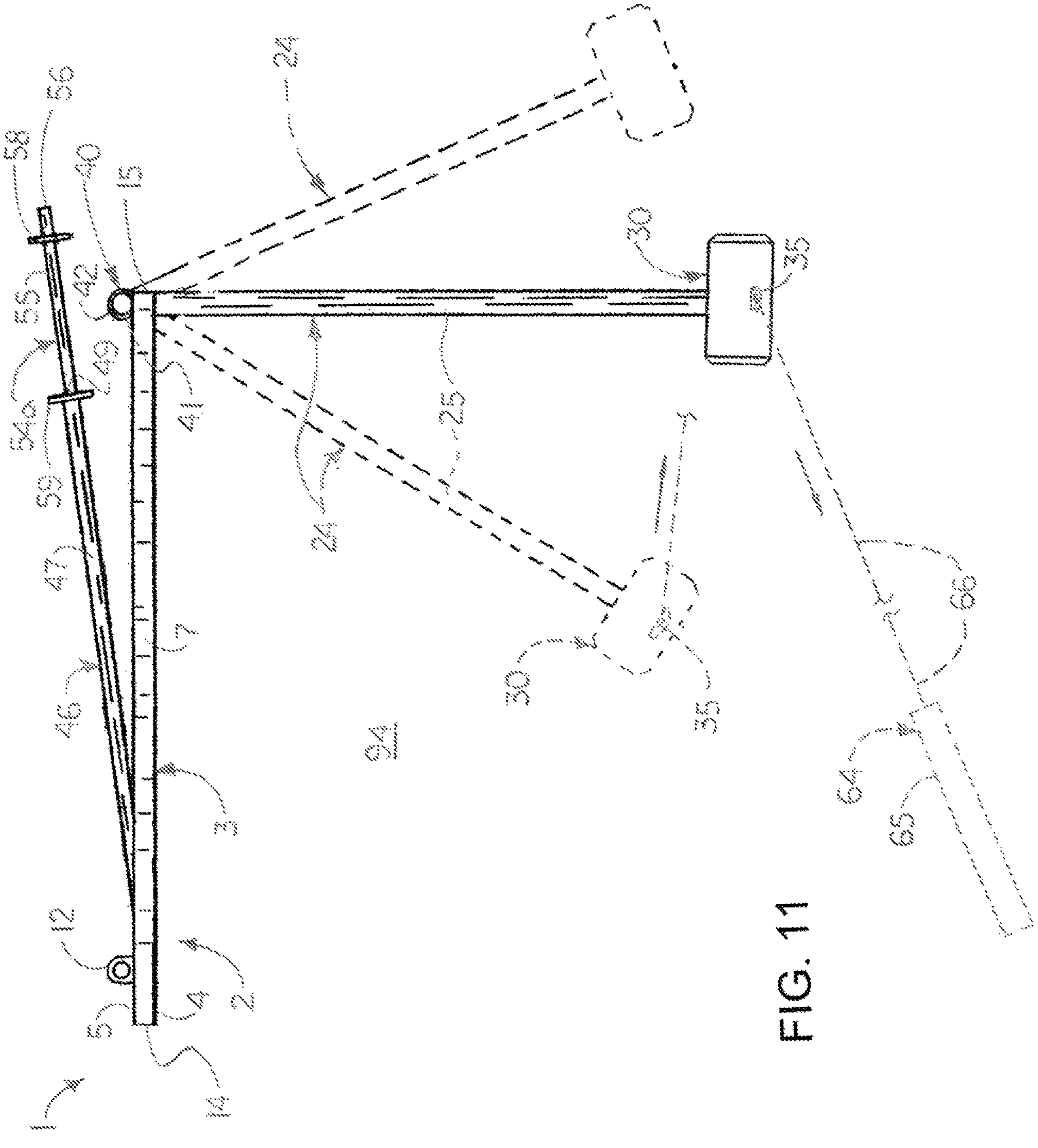
FIG. 11 is a side view of the illustrative pendulum hammer assembly, with the assembly hammer deployed in a suspended swingable hammer position from and beneath the assembly frame and a hammer tether (illustrated in phantom) attached to the assembly hammer, more particularly illustrating actuation of the suspended assembly hammer in the swinging motion by back-and-forth manipulation of the hammer tether in typical application of the pendulum hammer assembly.

At least one hammer assembly hinge 40 may be provided on the assembly frame 2. In some embodiments, the hammer assembly hinge 40 may be disposed at the rear frame member ends 15 of the respective assembly frame members 3 of the assembly frame 2. The assembly hammer 24 may be pivotally attached to the assembly frame 2 via the hammer assembly hinge 40, typically as will be hereinafter described. Accordingly, the hammer assembly hinge 40 may facilitate selective deployment of the assembly hammer 24 between the hammer stowage position (FIGS. 4 and 5) and the suspended, swingable hammer position (FIG. 11).

The assembly hammer 24 of the pendulum hammer assembly 1 may include a hammer shaft 25 which may be elongated. The hammer shaft 25 may have a hinge end 26 which is pivotally attached to the assembly frame 2 at the hammer assembly hinge 40, typically as will be hereinafter described, and a hammer head end 27 which is opposite the hinge end 26. A hammer head 30 may be provided at the hammer head end 27 of the hammer shaft 25. In the hammer stowage position of the assembly hammer 24, the hammer shaft 25 may rest on the assembly frame 2 and may be disposed at least partially within the frame space 18.

As further illustrated in FIG. 2, the hammer head 30 may include a pair of opposite strike surfaces 31. A side surface 32 may extend between the strike surfaces 31. The hammer head 30 may be attached to the hammer shaft 25 at the side surface 32 typically according to the knowledge of those skilled in the art. For example and without limitation, in some embodiments, the hammer head end 27 of the hammer shaft 25 may insert into a shaft opening (not illustrated) provided in the side surface 32 of the hammer head 30. The hammer head end 27 of the hammer shaft 25 may be secured in the shaft opening using mechanical fasteners and/or other techniques known by those skilled in the art.

The size and weight of the hammer head 30 may vary depending on the application. For example and without limitation, in some embodiments, the hammer head 30 may be a 65 lb. hammer head. In other applications, however, the hammer head 30 may be heavier or lighter depending on the size, weight, resistance, and other parameters of the workpiece 72.

In some embodiments, at least one tether attachment member 35 may be provided on the hammer head 30 of the assembly hammer 24. The tether attachment member 35 may include at least one or a pair of eye hooks disposed in spaced-apart relationship to each other on the side surface 32 of the hammer head 30. As illustrated in phantom in FIG. 11, a hammer tether 64 may be attachable to the tether attachment member 35. The hammer tether 64 may enable an operator (not illustrated) of the pendulum hammer assembly 1 to facilitate the swinging motion of the suspended assembly hammer 24 beneath the assembly frame 2, typically by back-and-forth movement of the hammer tether 64, to facilitate striking contact between the hammer head 30 and the workpiece 72. The hammer tether 64 may have any design which is suitable for the purpose. For example and without limitation, in some embodiments, the hammer tether 64 may include a tether handle 65. An elongated, flexible tether member 66 may extend from the tether handle 65. The tether member 66 may include a string, rope, cable, cord and/or other suitable member which can be clipped, tied, or otherwise attached to the tether attachment member 35 on the hammer head 30 to enable the operator to swing the assembly hammer 24 by manipulation of the hammer tether 64. In some embodiments, the tether member 66 may include a horse leash which may be standard or conventional.

Figure 3:
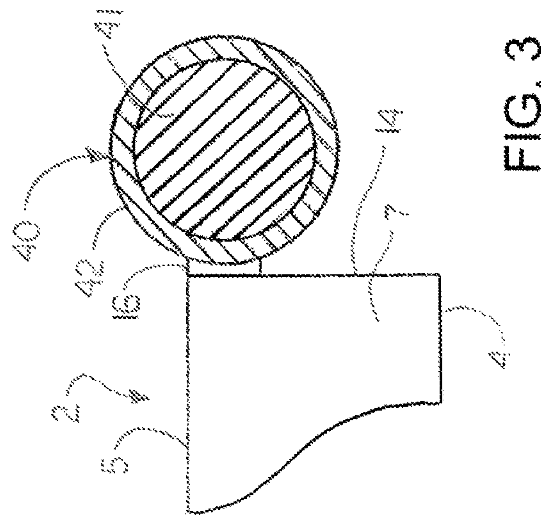
FIG. 3 is a cross-sectional view, taken along section lines 3-3 in FIG. 2, of a typical hammer assembly hinge suitable for mounting the assembly hammer on the assembly frame.

The hammer assembly hinge 40 may have any design which is suitable for the purpose of pivotally mounting the hammer shaft 25 of the assembly hammer 24 to the assembly frame members 3 of the assembly frame 2. For example and without limitation, as illustrated in FIGS. 2 and 3, in some embodiments, the hammer assembly hinge 40 may include a hinge rod 41. The hinge rod 41 may be attached to the rear frame member ends 15 of the respective assembly frame members 3 such as via a weld 16 (FIG. 3). Additionally or alternatively, any of various mechanical fasteners known by those skilled in the art may be used for the purpose. A hinge sleeve 42 may receive the hinge rod 41. The hinge sleeve 42 may span the frame space 18 at the rear frame member ends 15 of the respective assembly frame members 3. The hinge sleeve 42 may be slidably rotatable with respect to the hinge rod 41. The hinge end 26 on the hammer shaft 25 of the assembly hammer 24 may be attached to the hinge sleeve 42 such as via a weld and/or using mechanical fasteners (not illustrated) suitable for the purpose. Accordingly, as the assembly hammer 24 deploys between the hammer stowage position and the swingable hammer position, the hinge sleeve 42 may rotate with respect to the hinge rod 41 of the hammer assembly hinge 40. It will be recognized and understood that the hammer assembly hinge 40 may have alternative structures and designs any of which is suitable for pivotally mounting the assembly hammer 24 to the assembly frame 2.

In some embodiments, at least one strike pin 54 may be supported by the assembly frame 2. As illustrated in FIG. 1 and will be hereinafter further described, in some applications, the strike pin 54 may provide a strike medium between the hammer head 30 of the assembly hammer 24 and the workpiece 72. At least one strike pin holder 46 may be supported by the assembly frame 2. The strike pin 54 may be selectively deployable in a pin stowage position (FIG. 8) in the strike pin holder 46 and in a functional position removed from the strike pin holder 46 (FIG. 9) for use.

Figure 10:
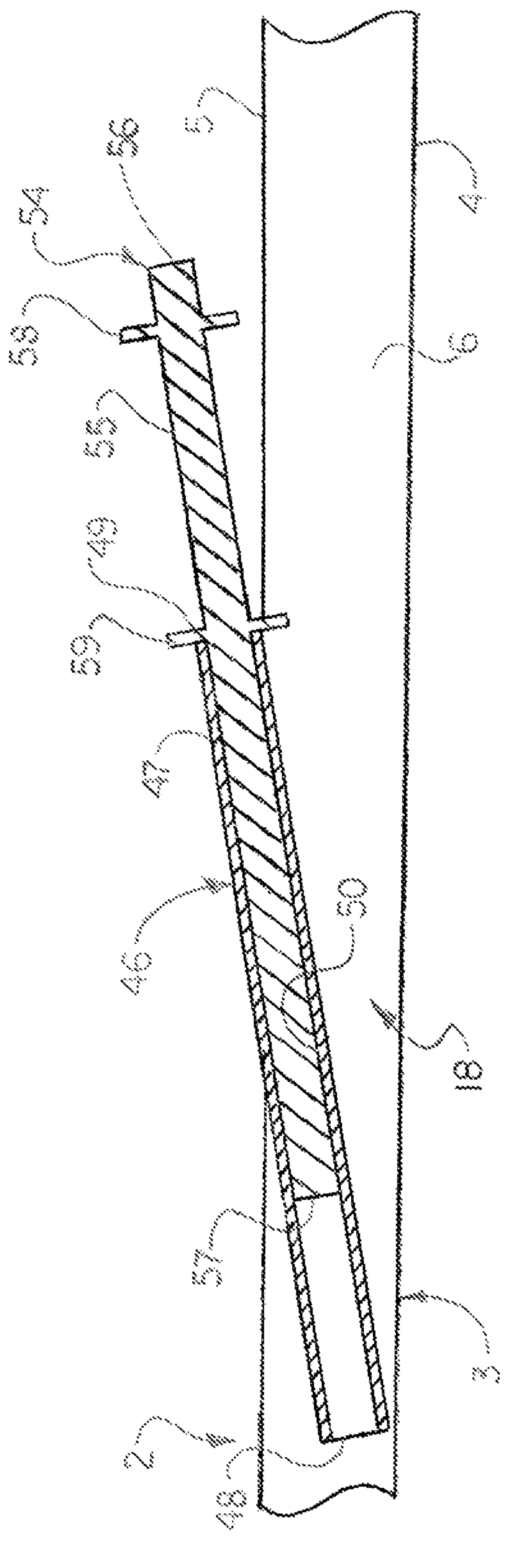
FIG. 10 is a longitudinal sectional view, taken along section lines 10-10 in FIG. 2, of a strike pin holder on the assembly frame and a strike pin deployed in a pin stowage position in the strike pin holder.

Each strike pin holder 46 may have any design which is suitable for supporting the strike pin 54 in the pin stowage position on the assembly frame 2. For example and without limitation, in some embodiments, each strike pin holder 46 may have an elongated holder wall 47. As illustrated in FIG. 10, in some embodiments, the holder wall 47 may be supported by the assembly frame member 3. For example and without limitation, the holder wall 47 may be welded, fastened and/or otherwise attached to the inner member panel 6 of the assembly frame member 3 typically according to the knowledge of those skilled in the art. The holder wall 47 may have a frame attachment end 48 and an opposite, pin insertion end 49. A holder interior 50 may be formed by the holder wall 47 from the frame end 48 to the insertion end 49. The holder interior 50 may be suitably sized and configured to accommodate the strike pin 54 in the pin stowage position. In some embodiments, the strike pin holder 46 may be disposed at an angle with respect to a frame plane formed by the assembly frame members 3 of the assembly frame 2, as illustrated. From the frame attachment end 48 to the pin insertion end 49, the strike pin holder 46 may angle or slope rearwardly and upwardly toward the rear frame member end 15 of the assembly frame member 3.

The strike pin 54 may include an elongated strike pin shaft 55. The strike pin shaft 55 may have a hammer strike end 56 and a workpiece strike end 57. Aproximal pin flange 58 may protrude outwardly from the strike pin shaft 55 proximate to and in spaced-apart relationship to the hammer strike end 56. A distal pin flange 59 may protrude outwardly from the strike pi shaft 55 in spaced-apart relationship to the proximal pin flange 58. When the strike pin 54 is deployed in the pin stowage position in the holder interior 50 of the strike pin holder 46, as illustrated in FIG. 10, the distal pin flange 59 may engage the pin insertion end 49 of the holder wall 47.

As illustrated in FIG. 2, in some embodiments, at least two strike pins 54*a*, 54*b* may be supported by the assembly frame 2. The strike pines 54*a*, 54*b* may have different sizes typically depending on the size of a fastener 91 (FIG. 18) or other workpiece 72 to which the assembly hammer 24 is to be applied. For example and without limitation, in some embodiments, a large strike pin 54*a* and a small strike pin 54*b* may be supported by the assembly frame 2. The strike pin shaft 55 of each strike pin 54 may have a width or diameter which generally corresponds to the width or diameter of the workpiece 72 to which the strike pin 54 is to be applied in application of the assembly hammer 24 to the workpiece 72. In the pin stowage position, each of the large strike pin 54*a* and the small strike pin 54*b* may be deployed in its corresponding strike pin holder 46.

Figure 16:
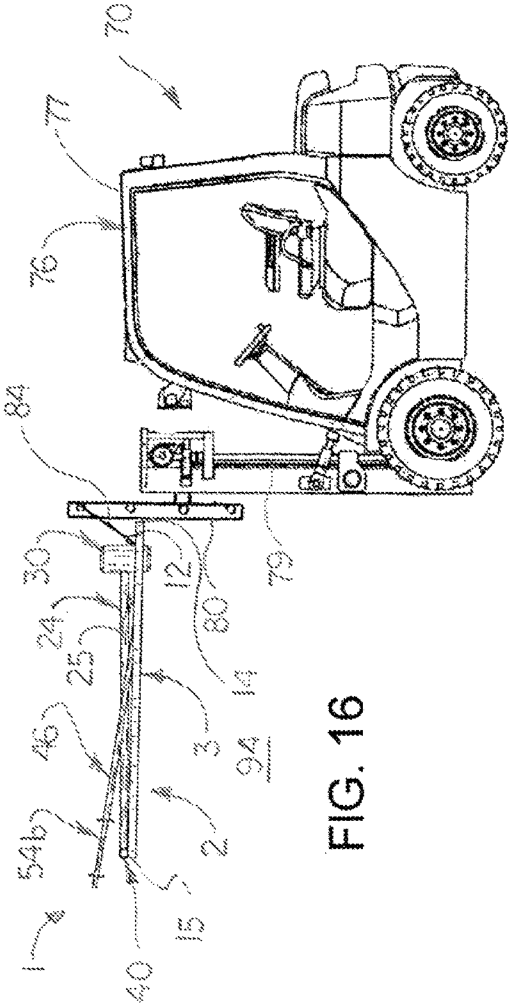
FIG. 16 is a side view of the pendulum hammer assembly and the lift frame in a raised position on the fork truck and the assembly hammer remaining in the hammer stowage position on the assembly frame.
Figure 17:
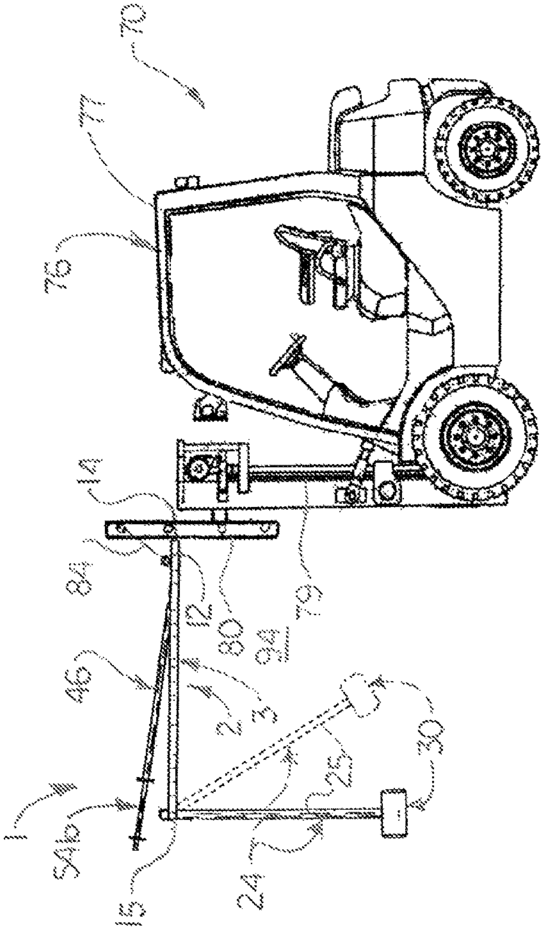
FIG. 17 is a side view of the pendulum hammer assembly and the lift frame in the raised position on the fork truck and the assembly hammer in the swingable hammer position in which the assembly hammer is suspended beneath the assembly frame.
Figure 18:
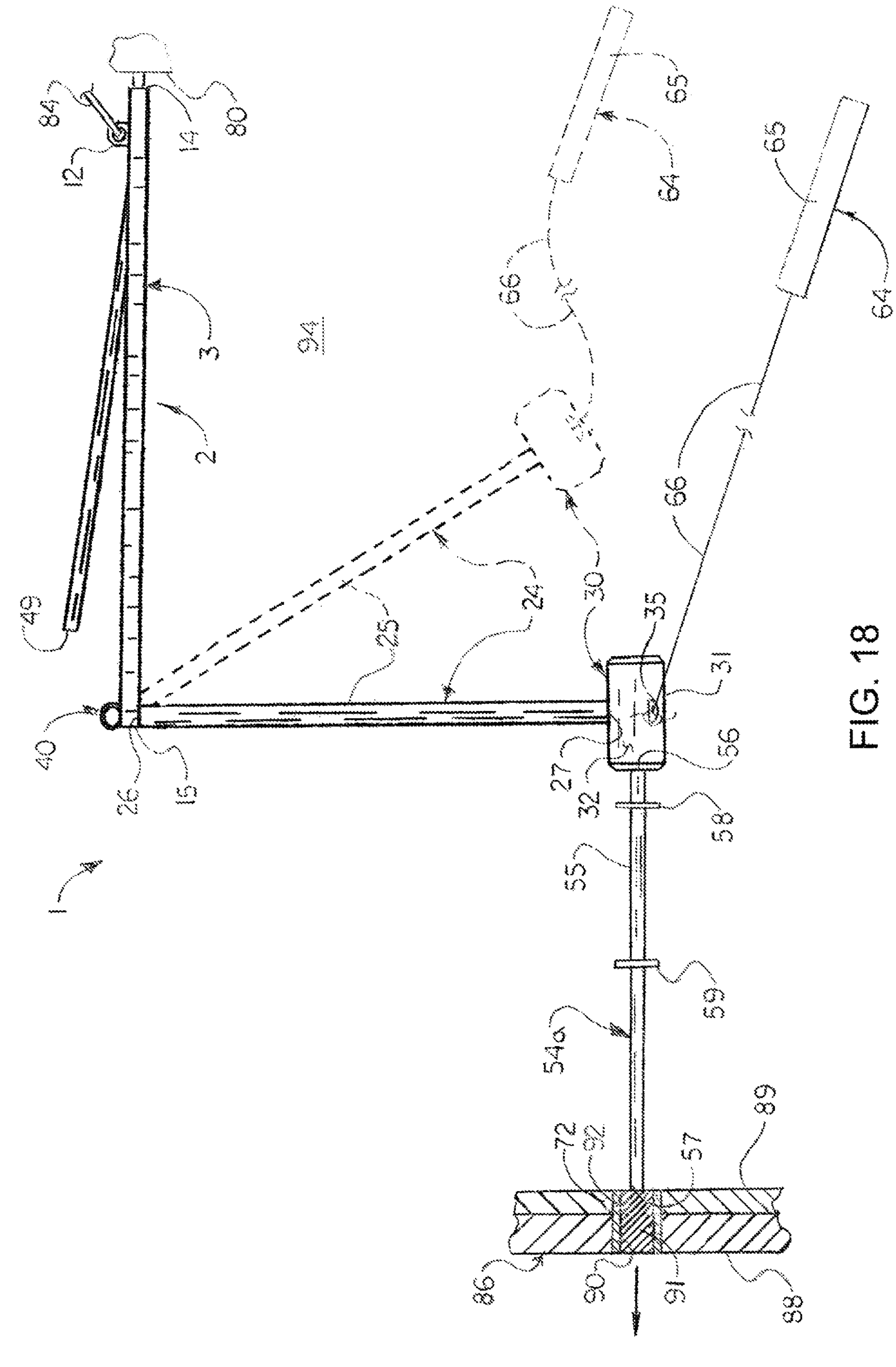
FIG. 18 is an enlarged side view of the pendulum hammer assembly as the suspended assembly hammer is operated in a swinging motion to strike a fastener in a fastener opening extending through a first component and a second component of a structure for removal of the fastener from the fastener opening in typical application of the pendulum hammer assembly.

Referring next to FIGS. 12-18 of the drawings, in typical application, the pendulum hammer assembly 1 may be deployed on the lift frame 80 of a fork truck 76. The fork truck 76 may be operated to raise or elevate the pendulum hammer assembly 1 and the assembly hammer 24 deployed from the resting hammer stowage position on the assembly frame 2 to the swingable hammer position in which the assembly hammer 24 is suspended from the assembly frame 2 within the swing space 94 beneath the assembly frame 2. The suspended assembly hammer 24 may be actuated in a back-and-forth swinging motion within the swing space 94 beneath the assembly frame 2 to repeatedly strike a workpiece 72 such as a pin or other fastener 91 which connects a second component 89 to a first component 88 in a structure 86, as illustrated in FIG. 18. The fastener 91 may extend through a bushing 92 in a fastener opening 90 in the first component 88 and the second component 89. The assembly hammer 24 may therefore facilitate expeditious removal of the fastener 91 from the bushing 92 in the fastener opening 90. In some applications, the fastener 91 may attach a backhoe bucket to a bucket actuating arm on a backhoe or other earth moving machinery, for example and without limitation. The fork truck 76 may have a conventional fork truck design with a chassis 77, an elevatable lift frame 80 on the chassis 77, at least one lift cylinder 79 on the chassis 77 and drivingly engaging the lift frame 80, and a pair of spaced-apart lift frame arms 81 which extend from the lift frame 80.

Figure 12:
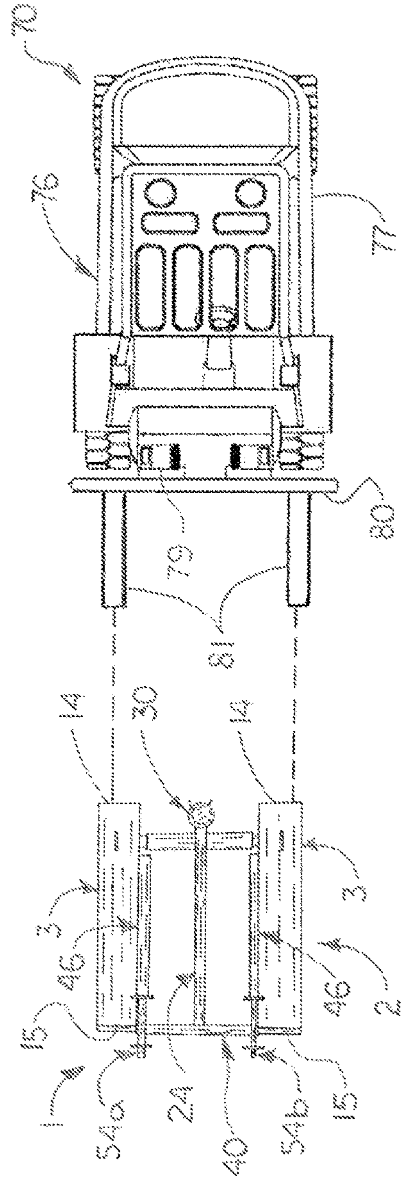
FIG. 12 is an exploded top view illustrating typical initial alignment of the assembly frame on the illustrative pendulum hammer assembly with a pair of lift frame arms on a lift frame of a fork truck preparatory to mounting the pendulum hammer assembly on the lift frame.
Figure 13:
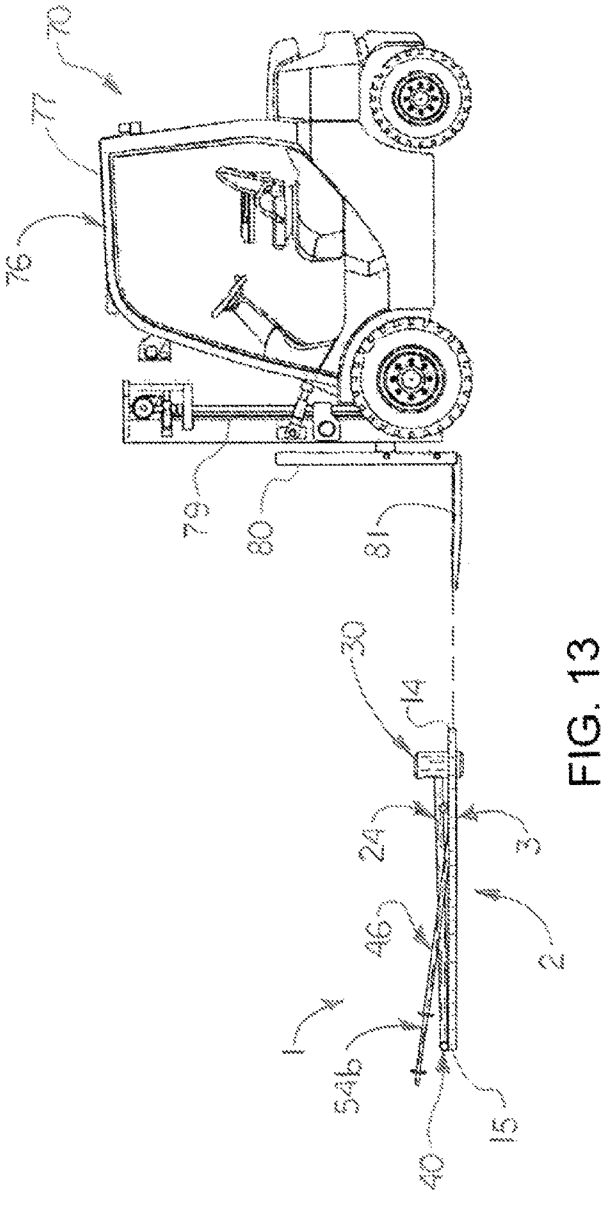
FIG. 13 is an exploded side view of the fork truck and pendulum hammer assembly illustrated in FIG. 12.
Figure 14:
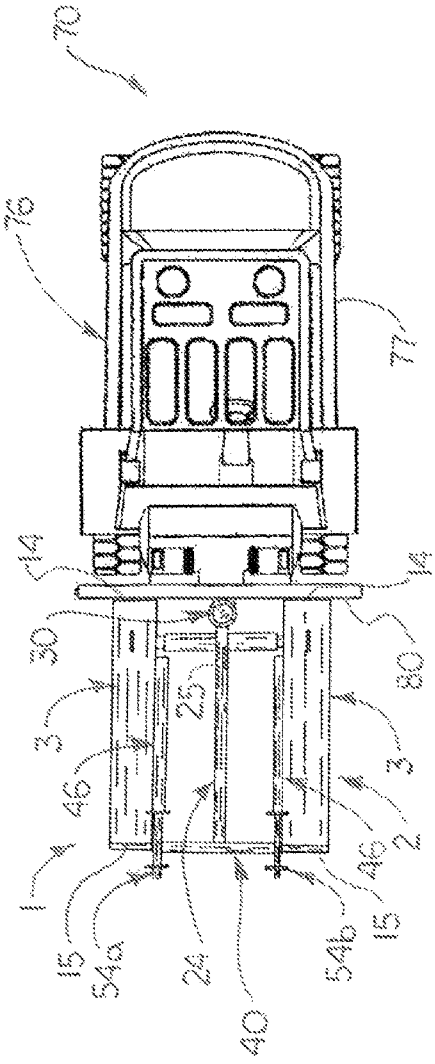
FIG. 14 is a top view of the pendulum hammer assembly mounted on the lift frame of the fork truck.
Figure 15:
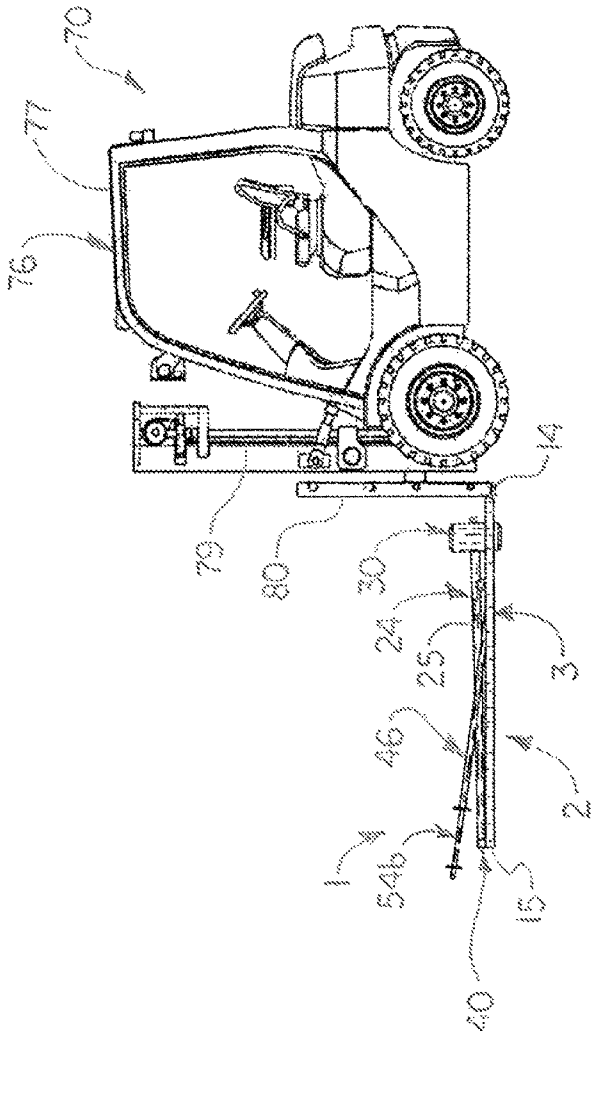
FIG. 15 is a side view of the pendulum hammer assembly mounted on the lift frame of the fork truck as illustrated in FIG. 14, with the pendulum hammer assembly and the lift frame in an initial lowered position on the fork truck.

As illustrated in FIGS. 12 and 13, the lift frame 80 of the fork truck 76 may initially be deployed in the lowermost position on the chassis 77 of the fork truck 76, typically by actuation of the lift cylinder or cylinders 79. The assembly frame members 3 of the assembly frame 2 may be placed on a floor or other support surface (not illustrated) behind the fork truck 76, with the open front frame member ends 14 of the respective assembly frame members 3 facing and registering with the respective lift frame arms 81 on the lift frame 80 of the fork truck 76. As illustrated in FIGS. 14 and 15, the assembly frame 2 may next be slid or moved forwardly toward the lift frame arms 81 or the fork truck 76 operated in the rearward direction until the assembly frame members 3 of the assembly frame 2 slide in place over the respective lift frame arms 81 and the lift frame arms 81 insert into the frame member interiors 10 (FIG. 2) of the respective assembly frame members 3.

As illustrated in FIG. 16, in some applications, at least one frame support cable 84 may be deployed between a cable eye 12 on the assembly frame 2 and the lift frame 80 to stabilize the assembly frame members 3 of the assembly frame 2 on the lift frame 80. The lift frame 80 may next be elevated on the chassis 77 typically by actuation of the lift cylinders 79. The lift frame arms 81 on the lift frame 80 may thus correspondingly raise the pendulum hammer assembly 1 to the desired height or operating position above the floor or other support surface, thereby forming the hammer swing space 94 beneath the assembly frame 2. The operating position of the pendulum hammer assembly 1, or its vertical height or position above the floor or other support surface, may depend on the height or vertical position of the workpiece 72 as well as the length of the hammer shaft 25 of the assembly hammer 24.

The assembly hammer 24 may next be deployed from the resting hammer stowage position on the assembly frame 2, as illustrated in FIG. 16, to the swingable hammer position in which the assembly hammer 24 is suspended from the assembly frame 2 within the hammer swing space 94 beneath the assembly frame 2, as illustrated in FIG. 17. The fork truck 76 may be operated in reverse to facilitate approach of the suspended assembly hammer 24 toward the fastener 91 (FIG. 18) or other workpiece 72 which is to be struck by the assembly hammer 24. In some applications, the strike pin 54 may be removed from the strike pin holder 46 on the assembly frame 2. The workpiece strike end 57 of the strike pin shaft 55 may be placed and held against the fastener 91. The assembly hammer 24 may then be manipulated in the swinging motion in which the assembly hammer 24 is repeatedly positioned rearwardly to a pre-strike position (illustrated in phantom in FIG. 18) and then forcefully swung forwardly such that a strike surface 31 on the hammer head 30 of the assembly hammer 24 strikes the hammer strike end 56 of the strike pin shaft 55 and the strike pin 54 strikes and incrementally dislodges the fastener 91 from the fastener opening 90. Actuation of the assembly hammer 24 may be repeated in the foregoing manner until the fastener 91 is completely dislodged from the fastener opening 90. In some applications, the strike pin 54 may be omitted and the assembly hammer 24 may be swung to facilitate direct contact of the strike surface 31 with the fastener 91 or other workpiece.

The assembly hammer 24 may be actuated in the swinging motion using any technique which is suitable for the purpose. For example and without limitation, as illustrated in FIG. 18, in some applications, the tether member 66 of the hammer tether 64 may be tied, clipped, or otherwise attached to a tether attachment member 35 on the side surface 32 of the hammer head 30. The tether handle 65 may then be gripped and the tether member 66 moved in a back-and-forth motion to swing the assembly hammer 24 between the pre-strike position and the strike position to strike the strike pin 54.

After use, the tether member 66 of the hammer tether 64 may be detached from the tether attachment member 35. The fork truck 76 may be operated in the forward direction to move the assembly hammer 24 away from the structure 86. The assembly hammer 24 may be returned from the swingable hammer position to the stowage hammer position on the assembly frame 2. In some applications, the lift frame 80 may be lowered on the fork truck 76 and the pendulum hammer assembly 1 may be removed from the lift frame arms 81 on the lift frame 80. In other applications, the pendulum hammer assembly 1 may remain in place on the lift frame 80 preparatory to another use.

While certain illustrative embodiments of the disclosure have been described above, it will be recognized and understood that various modifications can be made to the embodiments and the appended claims are intended to cover all such modifications which may fall within the spirit and scope of the disclosure.

I claim:

1. A pendulum hammer assembly suitable for mounting on an elevated or elevatable support structure, comprising:
- an assembly frame configured for deployment on the support structure, the assembly frame comprising:
  - a pair of elongated, parallel, spaced-apart assembly frame members;
  - a frame space between the assembly frame members; and
  - at least one hammer rest spanning the frame space and connecting the assembly frame members; and
- at least one assembly hammer supported by the assembly frame, the at least one assembly hammer selectively deployable in a hammer stowage position resting on the hammer rest of the assembly frame and a swingable hammer position suspended from and beneath the assembly frame.

2. The pendulum hammer assembly of claim 1 further comprising at least one strike pin supported by the assembly frame.

3. The pendulum hammer assembly of claim 2 further comprising at least one strike pin holder supported by the assembly frame, and wherein the at least one strike pin is deployable in a pin stowage position in the at least one strike pin holder and a functional position removed from the at least one strike pin holder.

4. The pendulum hammer assembly of claim 1 wherein each of the assembly frame members has a frame member interior, the frame member interior suitably sized and configured to receive a component of the support structure in mounting of the pendulum hammer assembly on the support structure.

5. The pendulum hammer assembly of claim 1 further comprising at least one cable eye on the assembly frame, the at least one cable eye sized and configured to receive at least one frame support cable attached to the support structure.

6. The pendulum hammer assembly of claim 1 further comprising at least one hammer assembly hinge pivotally connecting the assembly hammer to the assembly frame.

7. The pendulum hammer assembly of claim 1 wherein the frame space at least partially receives the assembly hammer in the hammer stowage position.

8. A pendulum hammer assembly suitable for mounting on an elevated or elevatable support structure, comprising:
- an assembly frame configured for deployment on the support structure;
- at least one assembly hammer supported by the assembly frame, the at least one assembly hammer selectively deployable in a hammer stowage position resting on the assembly frame and a swingable hammer position suspended from and beneath the assembly frame;
- wherein the assembly frame comprises a pair of elongated, parallel, spaced-apart assembly frame members and a frame space between the assembly frame members, and the frame space at least partially receives the assembly hammer in the hammer stowage position; and
- at least one hammer rest spanning the frame space and connecting the assembly frame members, and wherein the assembly hammer rests on the at least one hammer rest in the hammer stowage position.

9. The pendulum hammer assembly of claim 8 wherein the assembly frame members have a pair of frame member interiors, respectively, suitably sized and configured to receive a pair of components, respectively, of the support structure in mounting of the pendulum hammer assembly on the support structure.

10. The pendulum hammer assembly of claim 1 wherein the assembly hammer comprises a hammer shaft pivotally supported by the assembly frame and a hammer head supported by the hammer shaft.

11. The pendulum hammer assembly of claim 10 further comprising at least one tether attachment member on the hammer head.

12. The pendulum hammer assembly of claim 11 further comprising a hammer tether attachable to the at least one tether attachment member.

13. A pendulum hammer assembly suitable for mounting on a pair of lift frame arms on an elevatable lift frame of a fork truck, the pendulum hammer assembly comprising:
- an assembly frame configured for deployment on the lift frame of the fork truck, the assembly frame comprising:
  - a pair of elongated, parallel, spaced-apart assembly frame members having a pair of front frame member ends, respectively, a pair of rear frame member ends, respectively, and a pair of frame member interiors extending from the front frame member ends, respectively, the frame member interiors sized and configured to receive the pair of lift frame arms, respectively, on the lift frame of the fork truck; and
  - a frame space between the assembly frame members;
- at least one hammer assembly hinge on the assembly frame at the pair of rear frame member ends of the assembly frame members, respectively; and
- an assembly hammer comprising:
  - a hammer shaft having a hinge end pivotally carried by the assembly frame at the at least one hammer assembly hinge and a hammer head end opposite the hinge end; and
  - a hammer head supported by the hammer head end of the hammer shaft, the assembly hammer selectively deployable in a hammer stowage position wherein the hammer shaft rests on the assembly frame and is disposed at least partially within the frame space and a swingable hammer position wherein the assembly hammer is suspended from the rear frame member ends of the assembly frame members, respectively, and beneath the assembly frame at the at least one hammer hinge.

14. The pendulum hammer assembly of claim 13 further comprising at least one strike pin supported by the assembly frame.

15. The pendulum hammer assembly of claim 14 further comprising at least one strike pin holder supported by at least one of the assembly frame members of the assembly frame, and wherein the at least one strike pin is deployable in a pin stowage position in the at least one strike pin holder and a functional position removed from the at least one strike pin holder.

16. The pendulum hammer assembly of claim 15 wherein the at least one strike pin holder comprises a pair of strike pin holders and the at least one strike pin comprises a plurality of strike pins having different widths or diameters.

17. The pendulum hammer assembly of claim 13 further comprising a pair of cable eyes on the assembly frame members, respectively, of the assembly frame, the pair of cable eyes sized and configured to receive a pair of frame support cables, respectively, attached to the lift frame of the fork truck.

18. The pendulum hammer assembly of claim 13 further comprising at least one tether attachment member on the hammer head and a hammer tether attached to the at least one tether attachment member.

19. A pendulum hammer assembly suitable for mounting on a pair of lift frame arms on an elevatable lift frame of a fork truck, the pendulum hammer assembly comprising:
- an assembly frame configured for deployment on the lift frame of the fork truck, the assembly frame comprising:
  - a pair of elongated, parallel, spaced-apart assembly frame members having a pair of front frame member ends, respectively, a pair of rear frame member ends, respectively, a pair of frame member interiors extending from the front frame member ends, respectively, the frame member interiors sized and configured to receive the pair of lift frame arms, respectively, on the lift frame of the fork truck, and a pair of bottom member panels, respectively, a pair of top member panels, respectively, a pair of inner member panels, respectively, and a pair of outer member panels, respectively, extending from the front frame member ends, respectively, to the rear frame member ends, respectively;
  - a frame space between the inner member panels of the assembly frame members, respectively; and
  - at least one hammer rest spanning the frame space and connecting the inner member panels of the assembly frame members, respectively;
- at least one hammer assembly hinge on the assembly frame at the pair of rear frame member ends of the assembly frame members, respectively;
- an assembly hammer comprising:
  - a hammer shaft having a hinge end pivotally carried by the assembly frame at the at least one hammer assembly hinge and a hammer head end opposite the hinge end; and
  - a hammer head supported by the hammer head end of the hammer shaft, the assembly hammer selectively deployable in a hammer stowage position wherein the hammer shaft rests on the at least one hammer rest of the assembly frame and is disposed at least partially within the frame space and in a swingable hammer position wherein the assembly hammer is suspended from the rear frame member ends of the assembly frame members, respectively, and beneath the assembly frame at the at least one hammer hinge;

at least one strike pin holder supported by at least one of the assembly frame members of the assembly frame, the at least one strike pin holder disposed at an angle with respect to a frame plane formed by the assembly frame members, the at least one strike pin holder having an elongated holder wall supported by the inner member panel of the at least one of the assembly frame members and a holder interior formed by the holder wall; and at least one strike pin deployable in a pin stowage position in the holder interior of the at least one strike pin holder and in a functional position removed from the holder interior of the at least one strike pin holder.

20. The pendulum hammer assembly of claim 19 further comprising at least one tether attachment member on the hammer head and a hammer tether attached to the at least one tether attachment member.

* * * * *